(12) United States Patent
Huhn et al.

(10) Patent No.: US 9,308,872 B2
(45) Date of Patent: Apr. 12, 2016

(54) ROOF RACK FOR A VEHICLE

(71) Applicant: Ford Global Technologies, LLC, Dearborn, MI (US)

(72) Inventors: Henrik Huhn, Dusseldorf (DE); John Leslie Sullivan, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 14/198,055

(22) Filed: Mar. 5, 2014

(65) Prior Publication Data

US 2014/0183236 A1    Jul. 3, 2014

Related U.S. Application Data

(62) Division of application No. 13/171,572, filed on Jun. 29, 2011, now Pat. No. 8,678,257.

(51) Int. Cl.
*B60R 9/058* (2006.01)
*B60R 9/04* (2006.01)

(52) U.S. Cl.
CPC .. *B60R 9/04* (2013.01); *B60R 9/058* (2013.01)

(58) Field of Classification Search
CPC .................................. B60R 9/04; B60R 9/058
USPC ......... 224/309, 310, 315, 317, 319, 320, 321, 224/322, 325, 326, 329–331; 220/375, 810, 220/212; 215/227
See application file for complete search history.

(56) References Cited

U.S. PATENT DOCUMENTS

| 2,645,391 | A | * | 7/1953 | Lecanu-Deschamps | . B60R 9/04 224/325 |
|---|---|---|---|---|---|
| 4,084,735 | A | * | 4/1978 | Kappas | ..................... B60R 9/12 211/70.5 |
| 4,345,705 | A | * | 8/1982 | Graber | ..................... B60R 9/06 211/17 |
| 4,489,868 | A | * | 12/1984 | Thirion | ................... B60R 9/045 224/321 |

* cited by examiner

*Primary Examiner* — Adam Waggenspack
(74) *Attorney, Agent, or Firm* — LeClairRyan

(57) ABSTRACT

The invention relates to a roof rack (2) for a vehicle (K) comprising a front crossmember (3) and a rear crossmember (4), the crossmembers (3, 4) comprising fastening feet (5) at the end, by which they are supported on the lateral roof rails (DR), and in which at least the fastening feet (5) of the front crossmember (3) comprise fastening means (8), by means of which the fastening feet (5) are able to be secured to the respectively associated roof rail (DR) of the vehicle (K). For improved securing of the roof rack (2) to the vehicle (K) it is proposed that at least one crossmember (3, 4) is connected to the rear roof rail (HR) via at least one connection element (12).

14 Claims, 9 Drawing Sheets

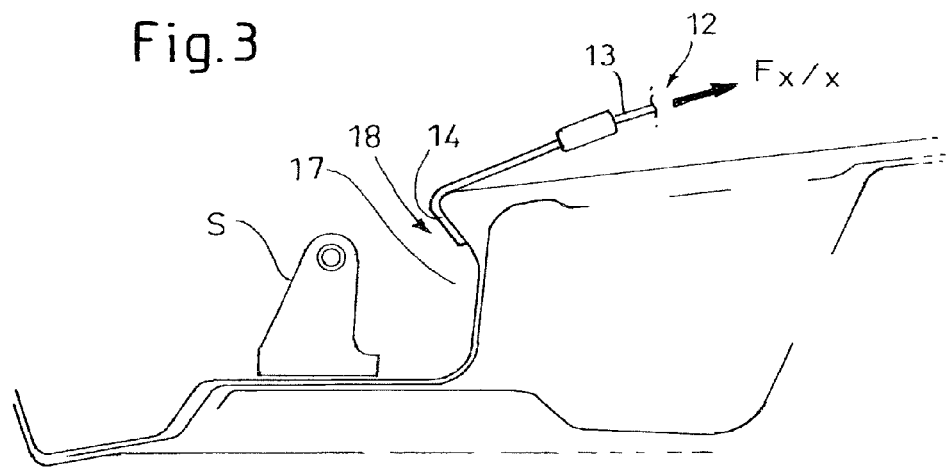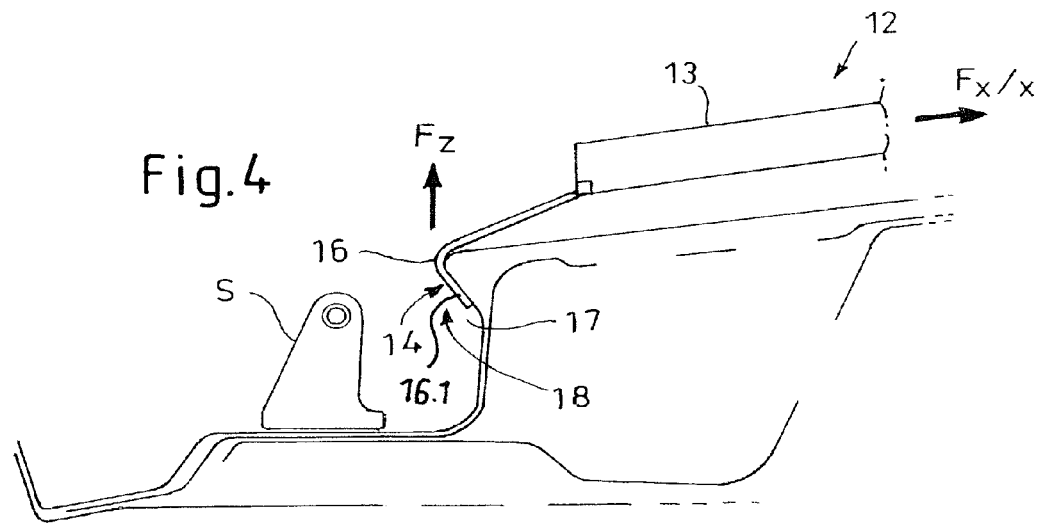

Figure 1:
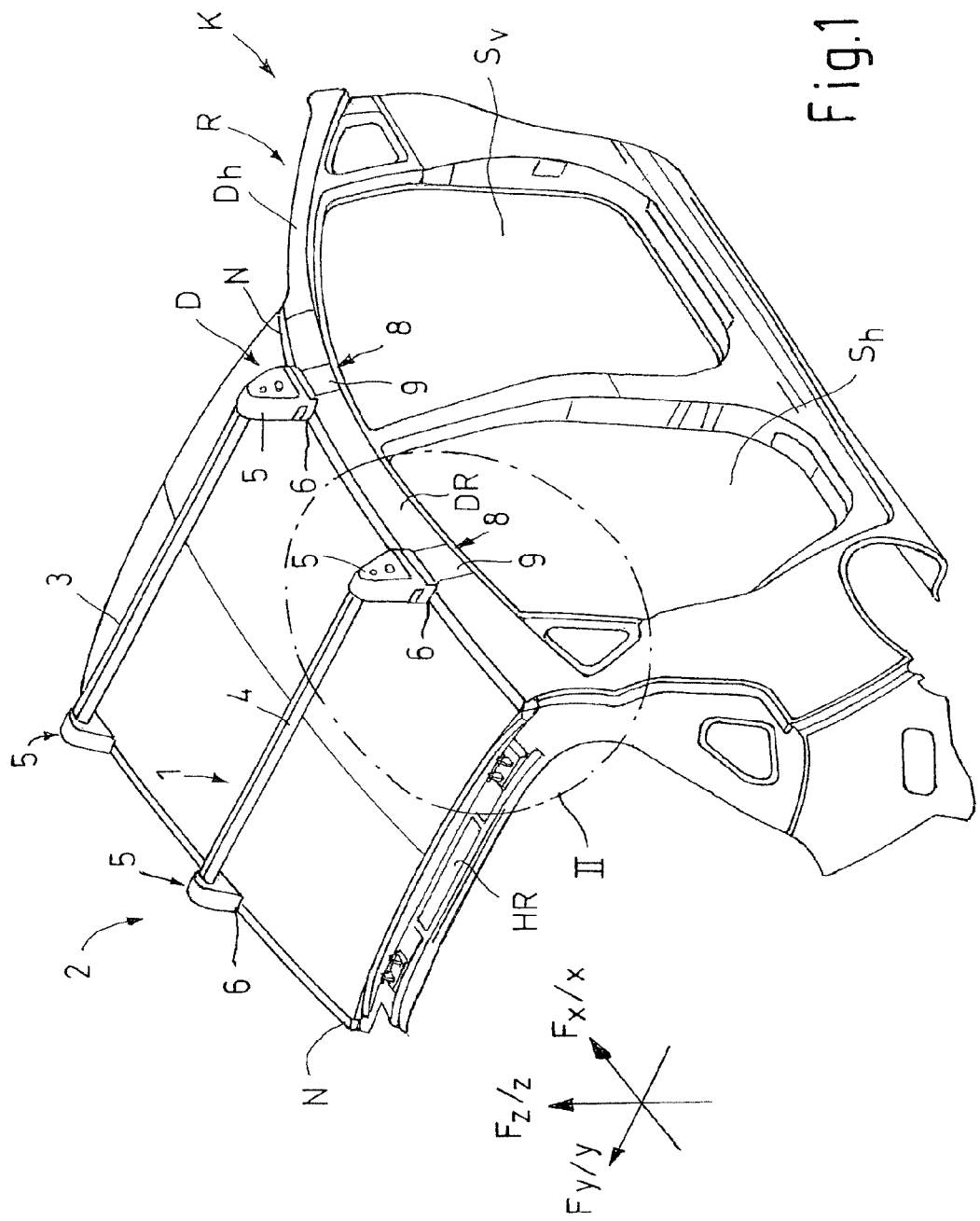

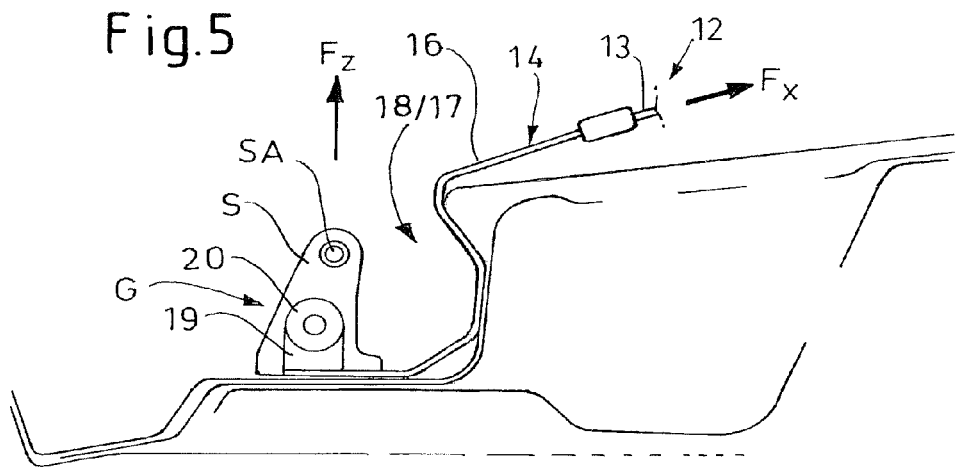
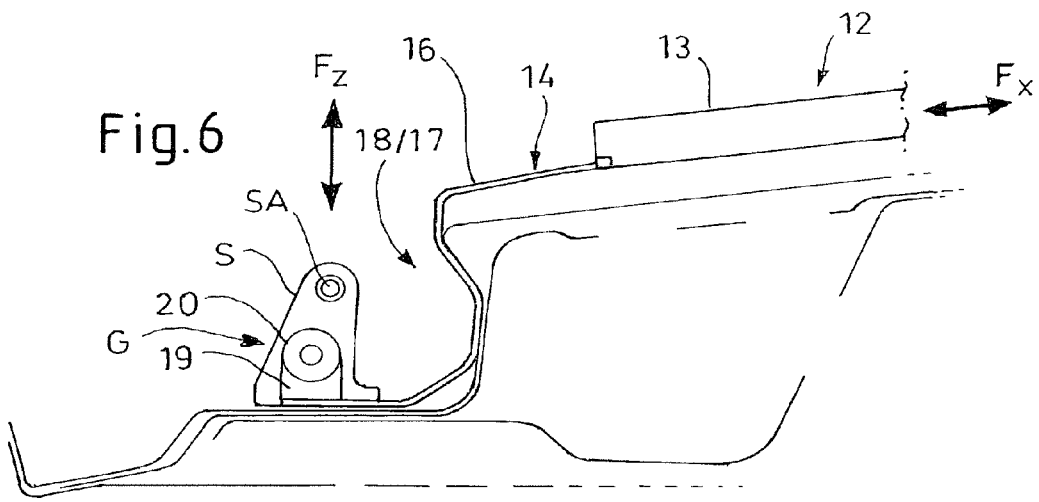

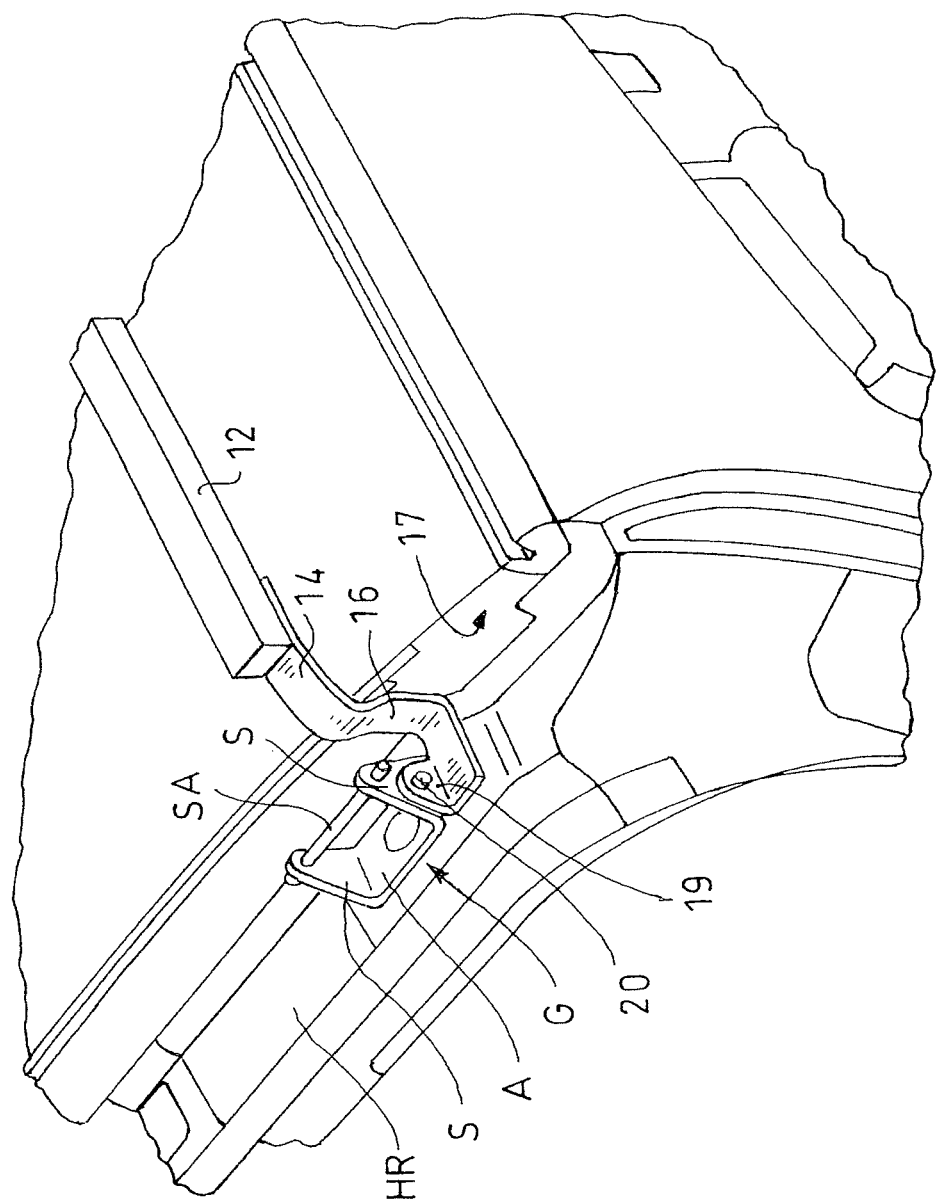

ROOF RACK FOR A VEHICLE

CROSS-REFERENCE TO RELATED APPLICATION

This application is a divisional of Application Ser. No. 13/171572, filed Jun. 29, 2011. The patent application identified above is incorporated here by reference to its Entirety to provide continuity of disclosure.

The invention relates to a roof rack for a vehicle comprising a front crossmember and a rear crossmember, the crossmembers comprising fastening feet at the end, by which they are supported on the lateral roof rails, and in which at least the fastening feet of the front crossmember comprise fastening means, by means of which the fastening feet are able to be secured to the respectively associated roof rail of the vehicle.

A crossmember of the roof rack of the aforementioned type is secured as part of a roof rack during the mounting thereof, for example, at the end to lateral rain channels and/or to the lateral roof rail. In this case, some of the crossmembers have an arcuate shape with curved pieces at the end comprising fastening feet.

A problem with roof loads fixed to such roof racks is that, in particular, with negative acceleration of the vehicle, such as during braking or a collision, as a result of their inertia, they exert large forces acting in the direction of travel of the vehicle on the crossmember and/or on the roof rack. In this case, the crossmember and/or the roof rack with the crossmember may slip, if not become detached, at least in the direction of travel in a dangerous fashion, so that the roof loads correspondingly could possibly be accelerated in the direction of travel and thus into the field of vision of the driver and/or into where an accident has occurred, in the manner of a projectile.

The roof rack is fastened to rain channels in DE 33 01 706 A1. In order to prevent the roof rack from slipping over the rain channels in the event of an impact, stop means are provided therein and/or thereon.

The object of the invention is to provide a roof rack of the aforementioned type which, in particular, relative to acceleration forces during braking or a collision, may be secured to the vehicle in a more positionally secure manner.

The object set forth is achieved according to the invention by the features of claim 1. Advantageous developments are described in the accompanying sub-claims. The object set forth is achieved, in particular, by at least one crossmember being connected to the rear roof rail via at least one connection element.

As a result, additional forces may be easily transmitted from the crossmember via the rear roof rail to the vehicle. By means of the crossmember, therefore, the roof rack and thus the loads carried thereby may be secured in an improved manner against a relative movement in and/or counter to the direction of travel. In this case, the connection element may act on the roof rail or be coupled thereto so that no additional precautions are necessary for securing the roof rack.

Thus the crossmember according to the invention may be accordingly mounted or provided on any vehicle designed for receiving a roof rack of the aforementioned type. In accordance with conventional notation, the direction of travel is the X-direction, the transverse direction transversely to the direction of travel and parallel to the floor is the Y-direction and perpendicular to the X-direction and Y-direction in the vertical direction of the vehicle is the Z-direction. In a purely frontal impact, in particular relative to the xz-plane, forces act on the roof rack which have to be transmitted to the vehicle via the roof rack. The connection element may be able to be coupled or arranged in a securable manner to the tailgate opening defined by the rear roof rail and/or to the tailgate opening frame of the vehicle and/or to a further crossmember of the roof rack.

The connection element may be configured for transmitting forces acting at least relative to the direction of travel on the crossmember, from the central support region of the cross bar to the bodywork and/or a frame of the tailgate opening and/or to a further crossmember. The connection element may, on the one hand, be connected or be able to be connected to the crossmember in a preferably central support region spaced apart from the fastening feet. The connection element may, on the other hand, be configured to be able to be coupled or secured to and/or in the frame of the tailgate opening of the vehicle and/or to a further crossmember of the roof rack. Thus in a region which is advantageous in terms of mechanical forces the crossmember may be secured at least against the above-described acceleration forces in the direction of travel.

The connection element is preferably of elongate configuration. It may be secured or be able to be coupled or secured at the end or in a central region to the central support region of the one crossmember. The connection element may connect both crossmembers to the bodywork and/or to the rear roof rail. It may connect the rear crossmember to the rear roof rail and/or to the front crossmember. The connection element may be configured as a tension rod, bending member or tensioning belt.

The connection element may comprise at the end and/or in a central region coupling means, such as for example a hook-like, clip-like or eye-like shaped portion, for a connection so as to exert force on the crossmembers and/or for connecting to the rear roof rail (HR) so as to exert force. A receiver for the coupling means may be provided on the rear roof rail. Preferably, the connection element is able to be connected positively and/or non-positively to the rear roof rail and/or to the receiver. It may be fixedly connected to the bodywork. For example, it may be screwed and/or clamped to the pivot joint or hinged joint of the tailgate. By this securing, in principle, forces and force moments may be transmitted to the bodywork relative to all spatial coordinates. In practice however this occurs mainly in and counter to the direction of travel and less relative to the vertical and the transverse direction. This is able to be used advantageously when, for example, fastening a roof rack to a 3-door vehicle without rear side doors. As the rear crossmember in a 3-door vehicle may not be connected, for example, laterally to the side door openings, the rear crossmember is able to be simply supported in the conventional manner in its first support regions via foot parts. Due to the crossmember according to the invention together with the connection element, however, a roof rack with two crossmembers may be positioned in a stable manner in terms of mechanical force onto the roof of such a 3-door vehicle. To this end, at least one rigid connection element functioning as a longitudinal member, which connects both crossmembers and connects the crossmembers to the rear roof edge, may be used. In this case, the connection element may advantageously be secured, in particular screwed or clamped, for further stiffening of the roof rack, to the frame of the tailgate opening, in particular to the hinged joint of the tailgate.

The coupling means in the installed position may engage in an undercut on the rear roof rail (HR) acting in the direction of travel. The rear roof rail may define, for example, a tailgate opening of the vehicle. Preferably, adapted to the profile of the undercut, the coupling means may engage therein in a hook-like manner. The coupling means configured as a hook with a bent-back end may be adapted at least via one portion to the profile of the undercut for bearing against the profile of the undercut. As a result, principally forces in the direction of travel may also be transmitted to a small extent in the vertical direction to the bodywork. Also, connection means present for bodywork parts, such as for example the hinged joint(s) provided for the tailgate of the vehicle, may additionally serve as a receiver for the coupling means. To this end, the coupling means may advantageously be configured as an eye or loop, which engages around the respective hinged joint on the outside and/or on both sides. The coupling means may be configured as a latching hook or as a spring hook.

The hinged joint may comprise a support for spacing apart a hinge axis from the rear roof rail. The coupling means may have at the end a tab which may be fastened to the support. Preferably, the tab is screwed thereto by lying flat against the support. The hinged joint may be of U-shaped configuration with two arms as a support and a cross bar as a hinge axis. Preferably, in the installed position of the roof rack the tab faces with a larger side surface at the end in the transverse direction. The tab may be screwed on the outside by bearing with the larger side surface against one of the arms. To this end, a corresponding screw receiver may be provided in the arms. Thus, with a conventional hinged joint for the tailgate only one additional screw receiver has to be incorporated for screwing-in the connection means.

In or on the rear roof rail, additional receivers for the coupling means may be provided, such as a bar arranged parallel and slightly spaced apart from the bodywork surface, on which the coupling means may act in an encompassing manner. Similar or the same receivers for the coupling means may be provided on the crossmembers.

The coupling means may be provided on one or both ends of the connection element. In this case, the coupling means may be configured for acting on one of the two crossmembers as a clamp, loop or tubular portion, which in the coupled position with their openings encompass the second support region at least partially over the periphery.

The connection element may be configured at least slightly flexibly over at least one longitudinal portion. As a result, in the event of negative acceleration of the vehicle, force may be introduced less abruptly which otherwise could more easily produce a failure of the connection element by breakage or tearing. The connection element may, for example, be configured as a cable, in particular as a steel cable, strap, woven fabric or mesh with preferably low flexibility in the longitudinal direction. Preferably, a connection element designated as a flexible connection element has the resilience of a conventional tensioning belt for tying down goods on a vehicle. Preferably, the connection element has such a tensioning belt in at least one longitudinal portion. In the installed position, it is provided that the connection element is tensioned in order to avoid, amongst other things, the flapping or swinging thereof during operation of the vehicle and to achieve immediate force absorption in the event of acceleration. The connection element may be arranged tensioned via a spring in the installed position.

The connection element may be of stiff or rigid configuration with preferably increased resistance to buckling, at least over the region of its longitudinal extent via which the force is transmitted. The connection element may be configured as a tension rod or bending member. Thus forces counter to the direction of travel may also be transmitted from the crossmember to the bodywork. The resistance to buckling may be such that in the installed position, at least with low forces on the connection element counter to the direction of travel, no buckling thereof occurs. Preferably, the connection element has a steel or aluminum profile with preferably a round cross section, at least respectively over the region of its longitudinal extent, via which the force is transmitted. The steel or aluminum profile may be configured as a preferably planar hollow profile and preferably with internal reinforcing structures. The rigid connection element may, in particular, function as a preferably continuous longitudinal member, in particular when it connects the two crossmembers, via which forces may also be transmitted in the transverse direction and/or vertical direction, with a corresponding connection to the two crossmembers. With a corresponding coupling of the rigid connection element to the rear roof rail, the forces may be transmitted to the bodywork.

In a preferred embodiment of the crossmember, the central support region thereof is arranged advantageously centrally relative to its longitudinal extent in terms of mechanical force. Thus the central support region may be arranged symmetrically spaced apart relative to both end support regions.

In a further preferred embodiment of the crossmember, two central support regions are provided spaced apart from one another in the longitudinal direction of the crossmember. These support regions are preferably arranged symmetrically relative to a longitudinal center of the crossmember. Thus the forces may be transmitted symmetrically to the vehicle. Preferably, in the installed position of the crossmember the two support regions are aligned with the vehicle, so that in each case they are arranged relative to the direction of travel at least approximately aligned with an associated hinged joint of the tailgate.

Preferably in at least two support regions the support regions may be additionally or solely connected to the receiver and/or to the vehicle, so that to this end the connection elements overlap. As a result, forces may also be transmitted perpendicular to the direction of travel and/or in the longitudinal direction of the cross bar.

The crossmembers may be arranged at least approximately in parallel, spaced apart from one another in the roof rack. Both crossmembers may form the roof rack. Both crossmembers may be formed according to one of the embodiments disclosed in the application.

In a preferred embodiment, the crossmember has fastening means, by means of which the fastening feet in the installed position of the crossmember may in each case be secured in or on an associated lateral door opening of the vehicle. Preferably, the fastening means are configured in the manner of a clamp. They may be designed so that they engage and/or act in the installed position by spring pretensioning, in each case in or on the lateral door opening. The fastening means may, in each case, be preferably configured as clamps in the manner of a leaf spring. The clamp may preferably be made in one piece from curved spring plate. The curved spring plate may be adapted at least approximately to the surface of the part of the bodywork which the clamp spans with engagement in the lateral door opening. In this case, on the side facing the bodywork the clamp may have paint protection, such as padding. The clamp may be configured to be able to be altered longitudinally.

In principle, for the force absorption all door openings of a vehicle are taken into account. As a result of the additional anchoring of the crossmember and/or the crossmembers to the door openings, in particular substantially greater forces relative to this xz-plane and force moments relative to the y-axis and the x-axis may be transmitted from the roof rack to the vehicle, so that in the event of a front impact the roof rack may accordingly remain more securely anchored to the roof.

Figure 2:
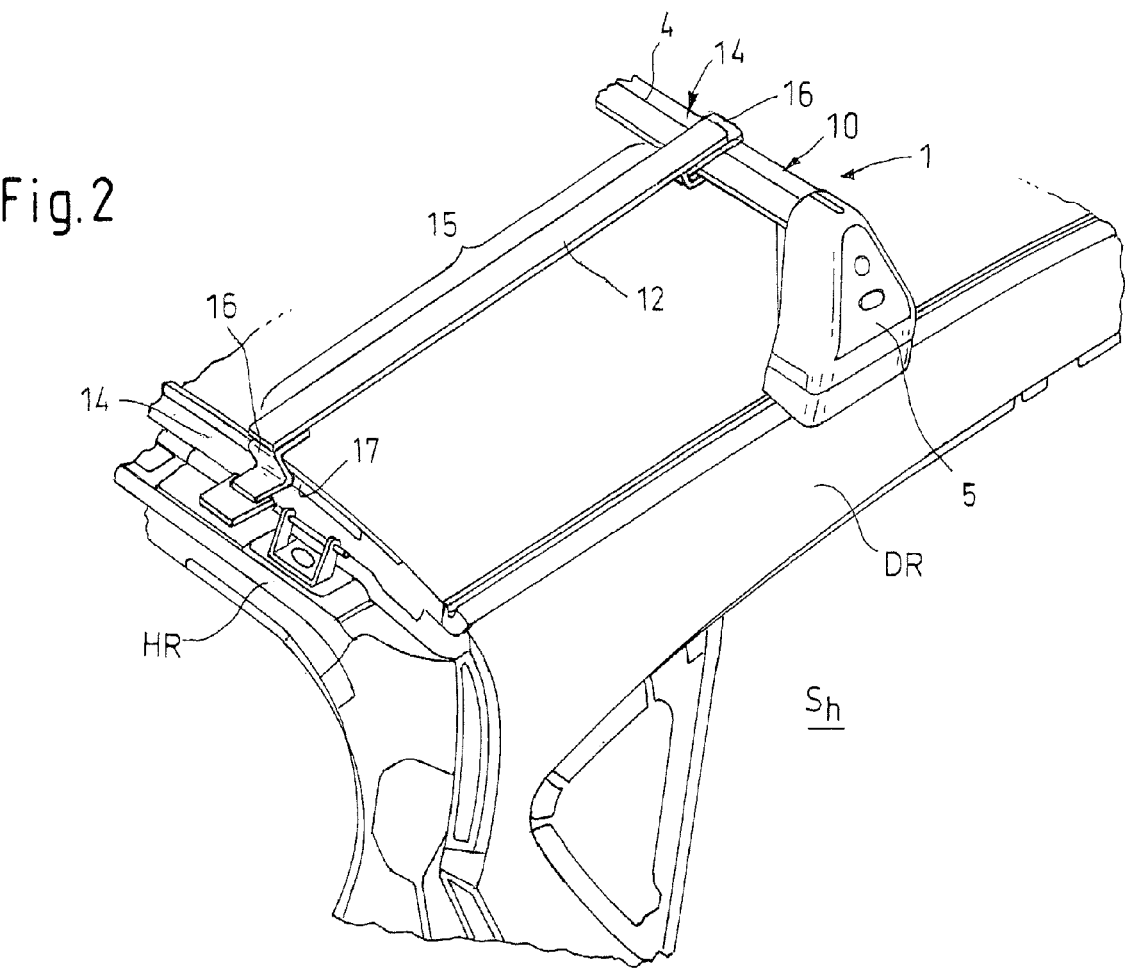
Figure 7:
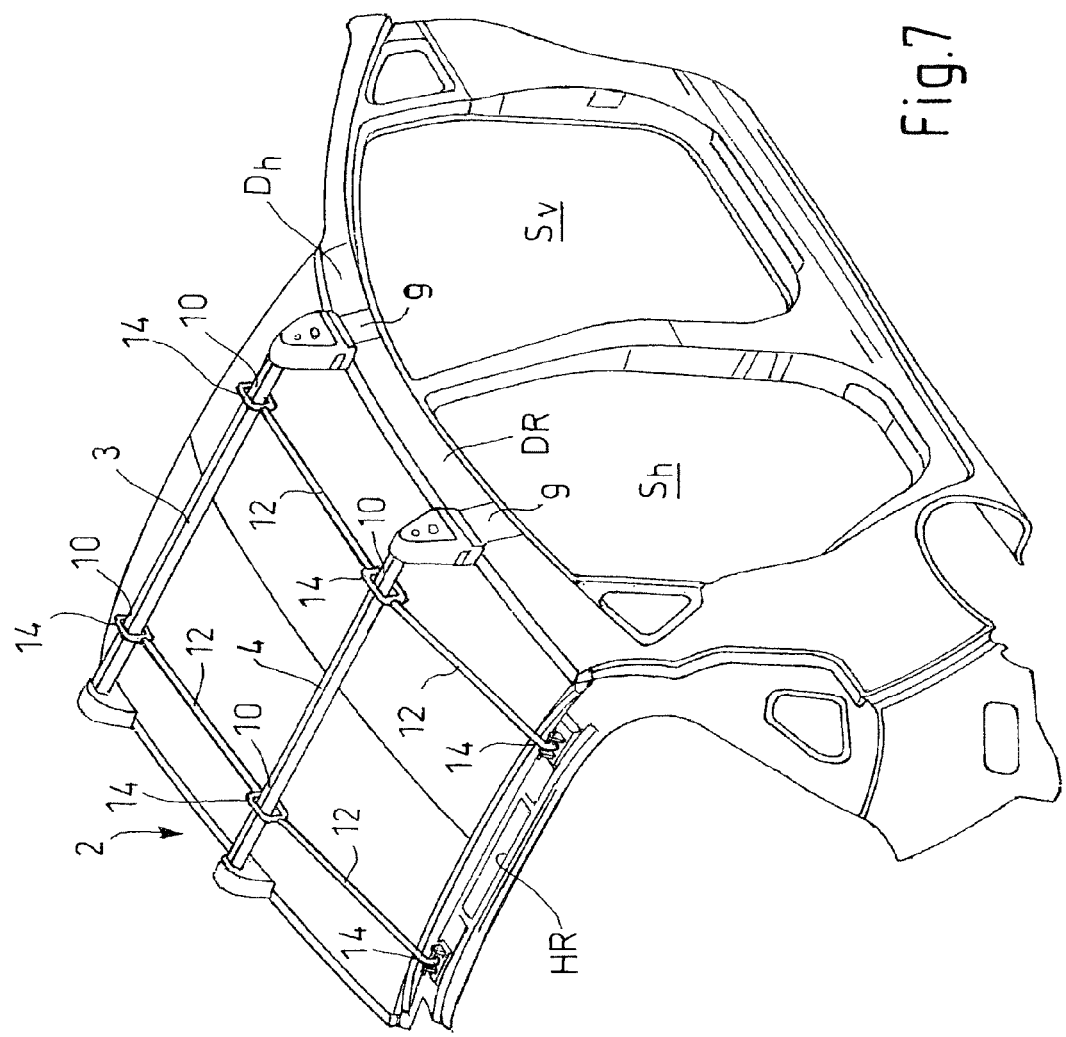
Figure 8:
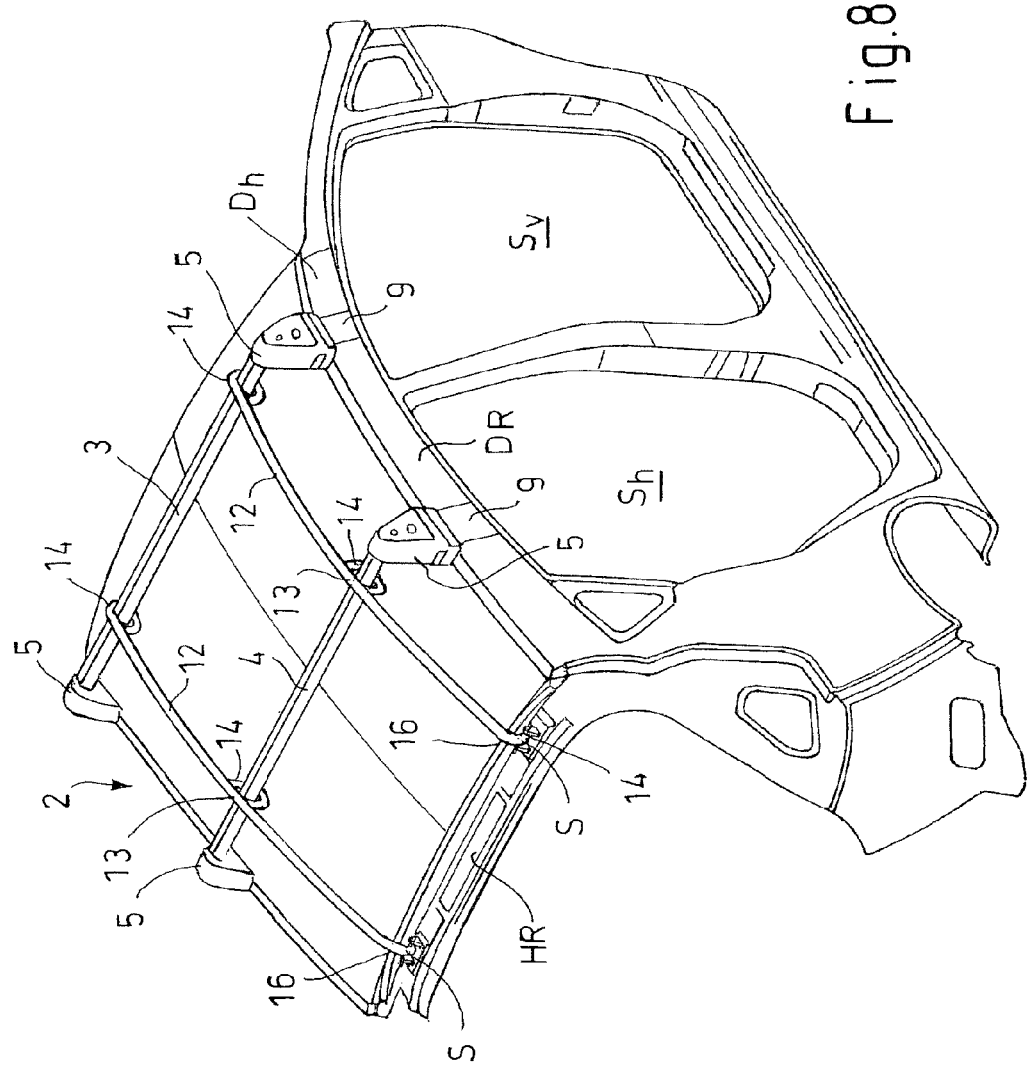
Figure 9:
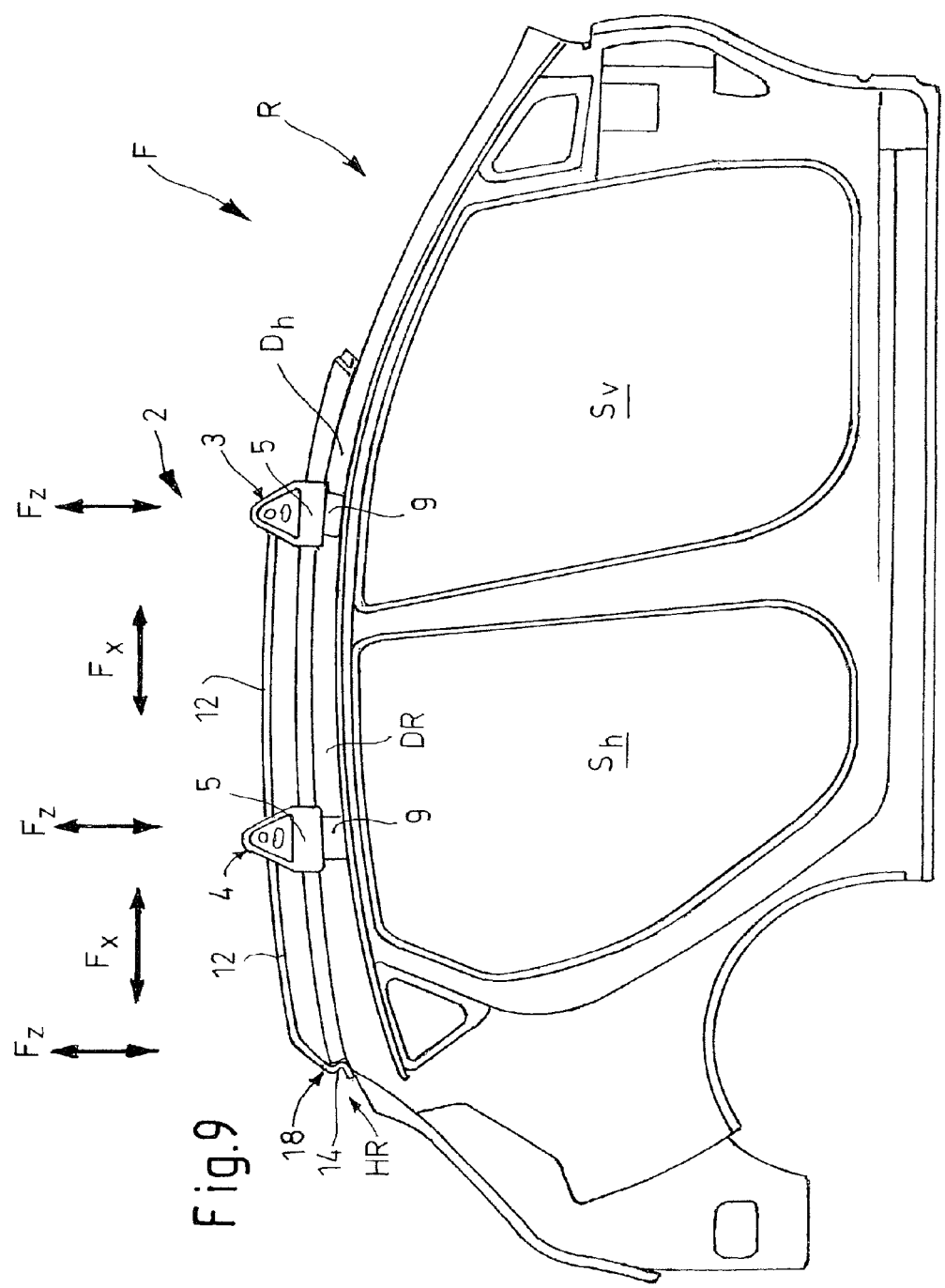
Figure 10:
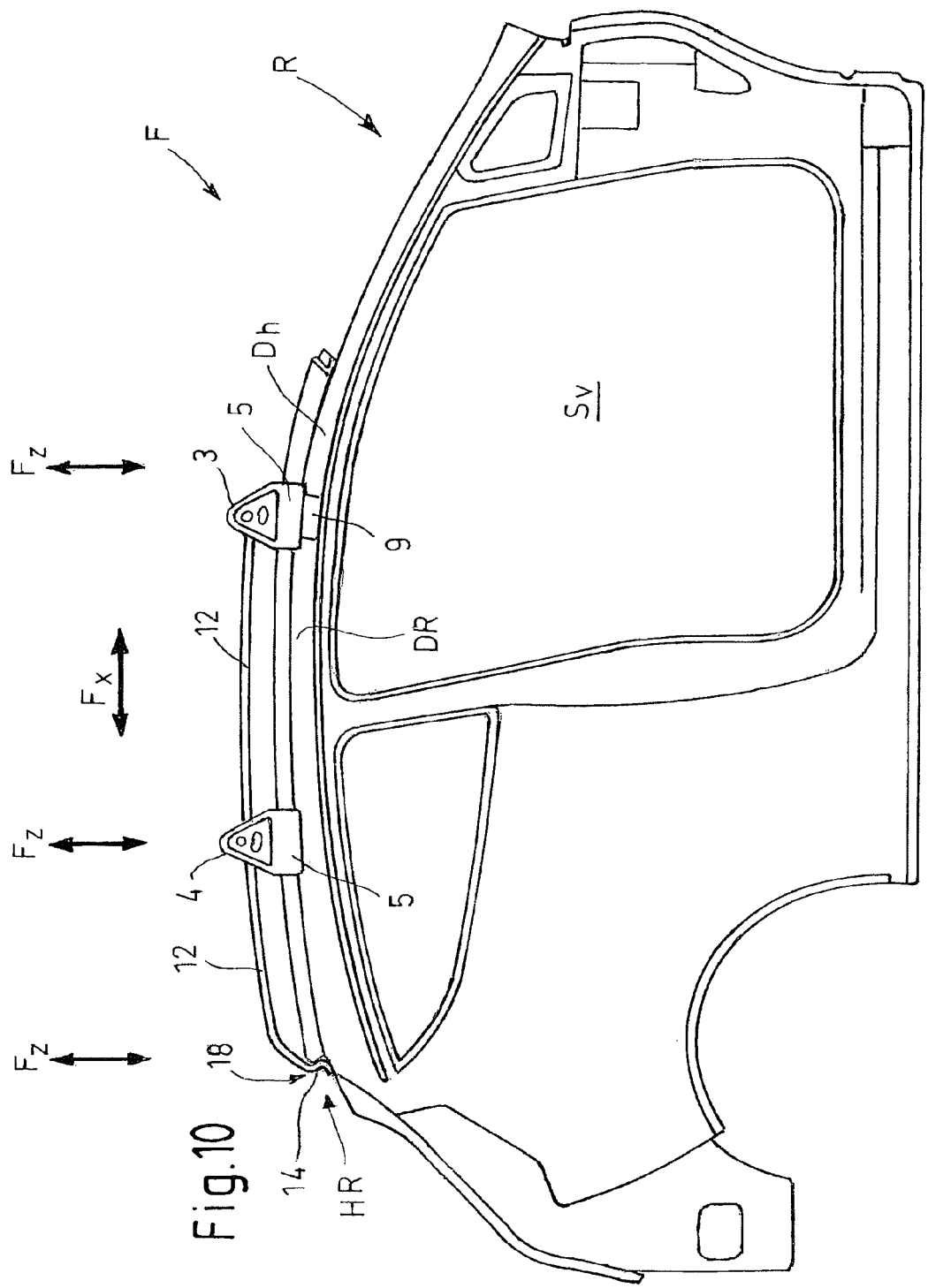

The present invention is described in more detail hereinafter with reference to a plurality of embodiments shown in the drawings, in which:

FIG. 1 shows a perspective plan view of a bodyshell of a 5-door vehicle with side door openings and a tailgate opening and of a roof rack fastened on the roof side with two crossmembers comprising connection elements as claimed in the prior art, FIG. 2 shows a detailed enlargement according to FIG. 1, but with an attached connection element, FIG. 3 shows a schematic longitudinal sectional view in the upper region of the tailgate opening with an attached connection element, FIG. 4 shows a schematic longitudinal sectional view as in FIG. 3, but with a further embodiment of the attached connection element, FIG. 5 shows a schematic longitudinal sectional view as in FIG. 3, but with a further embodiment of the attached connection element, FIG. 6 shows a schematic longitudinal sectional view as in FIG. 5, but with a further embodiment of the attached connection element, FIG. 6a shows a perspective view of the attached connection element of FIG. 6, FIG. 7 shows a perspective plan view according to FIG. 1, but with a further embodiment of the crossmembers in a partially schematic view, FIG. 8 shows a perspective plan view according to FIG. 7 but with a further embodiment of the crossmembers in a partially schematic view, FIG. 9 shows a side view of the bodyshell and crossmembers according to FIG. 8 and FIG. 10 shows a side view of a bodyshell of a 3-door vehicle and a further embodiment of the roof rack.

In FIG. 1, a roof rack 2 according to the prior art is shown, the roof rack 2 being mounted on a bodyshell R of a vehicle K. The roof rack 2 has a front crossmember 3 and a rear crossmember 4. Both crossmembers in this case have an arcuate shape with a rod-like rigid central part and fastening feet 5 at the end, by means of which the crossmembers 3, 4 to the left and right are supported on lateral roof rails DR of the vehicle K. In each case, an end support region 6 for supporting the crossmembers 3, 4 on the associated lateral roof rail DR is provided in the fastening feet 5. The support region 6 is provided with a resilient support and preferably has the contour of the roof structure and side wall structure located below in the region of the roof rail DR.

In the embodiments shown here, the crossmembers 3, 4 at the end support regions 6 have fastening means 8, by means of which the crossmembers 3, 4 may be secured to or in door openings $S_h$, $S_v$ of the vehicle K. By means of these fastening means 8, the end support regions 6 in the installed position of the crossmember 3, 4 shown here are secured in an associated front side door opening $S_v$ and/or in an associated rear side door opening $S_h$. These fastening means 8 are formed as clamps 9 in the embodiments of the crossmember 3, 4 shown here. These clamps, in each case secured in an associated end support region 6, respectively encompass an associated roof rail DR and engage laterally in the associated side door opening $S_h$, $S_v$. Thus the crossmembers 3, 4 are clamped in the lateral door openings $S_h$, $S_v$, on the roof rail DR. As is immediately visible, the vehicle K shown in FIG. 1 may be configured also as a 4-door vehicle, as in the embodiment of the roof rack 2 shown there, only a clamping of the crossmembers 3, 4 to the side doors $S_v$, $S_h$ is provided.

In the embodiment according to the invention of the roof rack 2 according to FIG. 2, the roof rack 2 has a further fastening means which, at least relative to the forces $F_x$ acting on the crossmembers 3, 4 in the direction of travel x, on the one hand, in the central support region 10 of the rear crossmember 4 is connected thereto so as to exert force, and, on the other hand, is coupled on and/or in the tailgate opening H and/or to the rear roof rail HR.

The further fastening means is formed in the embodiment shown here as an elongate connection element 12. The elongate connection element 12 is secured at the end in FIGS. 2 to 6 and/or in FIGS. 7 to 10 in a central region 13 with the central support region 10 to the rear crossmember 4, in each case via coupling means 14. At its other end, the connection element 12 is also secured via coupling means 14 to the rear roof rail HR of the vehicle K defining the tailgate opening H and/or according to FIGS. 7 to 10 to the front crossmember 3, at least relative to the direction of travel x so as to exert force.

In FIGS. 2 to 6, in particular possible embodiments of the connection element 12 and possible types of coupling or connection of the connection element 12 to the rear roof rail HR of the vehicle K are illustrated.

The connection element 12 according to FIG. 2 is formed in a central region 15 as a textile seat belt strap and engages at the end in each case, via a coupling means 14 formed as a hook 16, in an undercut 17 which is formed in the boundary of the tailgate opening H through the rear roof rail HR, and also in a receiver 18 provided on the tailgate opening H, incorporated in this case in the bodywork panel. With its other end, the connection element 12 also acts via a hook 16 on the central support region 10 of the crossmember 4. The hook 16 is in each case adapted to the undercut 17 and/or the central support region 10. The hook 16 has a bent-back end 16.1 which is substantially adapted to the profile of the undercut 17.

The connection element 12 may be simply hooked over the hook 16 and released again. The connection element 12 is in this case held under tension to avoid the flapping thereof and/or sudden tightening when a load is applied to the connection element 12.

In FIGS. 3 to 6, schematic longitudinal sectional views of the connection element 12 coupled to the tailgate opening H are shown in a detail. According to FIG. 3, the connection element 12 at the end also has a hook 16 as coupling means 14, which however engages only with its bent-back end 16.1 in the undercut 17. Its central region 15 is, in this case, configured as a wire cable or belt. Both have the result that the connection element 12 is only substantially able to introduce forces in the direction of travel x into the vehicle K. According to FIG. 4, the central region 15 of the connection element 12 in this case is configured as a profile, in particular as a flat aluminum profile, and rigidly connected to the hook 16. Thus increased rigidity is achieved, which permits the transmission of larger forces.

In FIGS. 5 and/or 6, the respectively shown connection element 12, including the coupling means 14 at the end, is the same as the connection element 12 shown in FIG. 3 and/or 2. Additionally, FIG. 6a shows a perspective view of the connection element 12 of FIG. 6 and the connection to the rear roof rail HR.

In FIGS. 5 and 6, the connection element 12 also engages with its coupling means 14 in the undercut 17, but is additionally secured to the hinged joint G for the tailgate, not shown here. The hinged joint G has a support A for spacing apart a hinge axis SA from the rear roof rail HR. The coupling means 14, in turn, comprises a tab 19 at the end which may be fastened to the support A. The hinged joint G is in this case U-shaped with two arms S as a support A and a cross bar as a hinge axis SA. The tab 19, facing in the transverse direction y, bears laterally flat against one of the arms S and is screwed and/or pinned by means of a screw and/or pin 20 at the side to the hinged joint G. The same is provided in the coupling of the connection element 12 according to FIG. 6, the connection element 12, however, in this case, similar to FIG. 4, in its central region 15 being configured as a profile, in this case as a planar steel profile. By the rigid connection of the central region 15 and hook 16, therefore, forces $F_x$ counter to the direction of travel x may also be transmitted from the crossmember 3, 4 and/or from the connection element 12 to the bodyshell R.

The roof rack 2 according to FIG. 7 is similar to that according to FIG. 1, the crossmembers 3, 4 however in this case additionally comprising two central support regions 10, via which they are connected together and/or to the rear roof rail HR of the tailgate opening H. The central support regions 10 are arranged spaced apart, mirror-symmetrically to a longitudinal center of the crossmember 3, 4. The rear crossmember 4, as shown in more detail in FIG. 6, is fixedly connected to the hinged joints G via two rigidly configured connection elements 12, the connection elements 12 in each case being connected fixedly to the rear crossmember 4 in one of their central support regions 10. Via two further connection elements 12, the two crossmembers 3, 4 in each case are connected together in their central support regions 10. The connection elements 12 are thus arranged in pairs mechanically one behind the other and arranged aligned with one another. Moreover, relative to the direction of travel x they are arranged aligned with the respectively associated hinged joint G of the tailgate, so that by the transmission of forces in the direction of travel x no harmful additional force moments may be produced.

The roof rack 2 according to FIG. 8 is similar to that according to FIG. 7, in this case only two connection elements 12 being provided, which in each case connect the two crossmembers 3, 4 and connect the crossmembers to the rear roof rail HR. To this end, the two connection elements 12 in each case in their central region 13 comprise coupling means 14. By means of the continuous rigid connection from the front crossmember 3 via the rear crossmember 4 to the tailgate opening H forces may be reliably and increasingly transmitted to the bodywork R.

FIG. 9 shows a side view of the roof rack 2 positioned on the bodyshell R, according to FIG. 8. For clarification of the anchoring of the roof rack 2 which is improved relative to the prior art, in this case the forces relative to the direction of travel x and the vertical direction z, i.e. relative to the xz-plane, which in this case is the same as the drawing plane, which may be transmitted via the roof rack 2 to the bodyshell R, may be purely qualitatively recorded. With a purely frontal impact, forces and force moments act increasingly on the roof rack 2, in particular relative to the xz-plane.

Whilst FIGS. 1 to 9 refer to a 5-door vehicle K, in FIG. 10 a side view is shown of the bodyshell R of a 3-door vehicle K without rear side doors and with a tailgate opening H. In this case, the front crossmember 3, as that according to FIG. 9, is connected so as to exert force by means of clamps 9, in its end support regions 6, to the front side door openings $S_v$, whilst the rear crossmember 4 in its bottom regions 5 is supported on the vehicle K. Both crossmembers 3, 4 are connected together in the central support regions 10 by means of the, in this case rod-like, connection element 12, which in turn at the end engages in the receiver 18 in the rear roof rail HR of the tailgate opening H. This design of the roof rack 2, in spite of absent rear side doors, permits a much improved force deflection relative to the prior art, of at least the forces $F_x$ acting relative to the direction of travel x on the roof rack 2.

LIST OF REFERENCE NUMERALS

2 Roof rack
3 Front crossmember
4 Rear crossmember
5 Bottom region
6 End support region
8 Fastening means
9 Clamp
10 Central support region
11 Fastening means
12 Connection element
13 Central region
14 Coupling means
15 Region
16 Hook
16.1 End
17 Undercut
18 Receiver
19 Tab
29 Screw
A Support
$D_h$ Roof rail
DR Lateral roof rail
HR Rear roof rail
$F_x$ Force in direction of travel
$F_y$ Force in transverse direction
$F_z$ Force in vertical direction
H Tailgate opening
$H_r$ Tailgate opening frame
K Vehicle
N Roof channel
R Bodyshell
S Arm
$S_h$ Rear side door opening
$S_v$ Front side door opening
G Hinged joint
SA Hinge axis
x Direction of travel
y Transverse direction
z Vertical direction

The invention claimed is:

1. A roof rack for a vehicle having lateral roof rails and a rear roof rail having an undercut area, the rack comprising:
    a crossmember;
    fastening feet attached to said crossmember and secured to the lateral roof rails;
    a connection element generally perpendicular to said crossmember, said crossmember being connected directly to the rear roof rail by said element, said element having a coupling that includes a bent-back end for placement against the undercut.

2. The roof rack of claim 1, wherein said connection element is selected from the group consisting of tension rod, a bending member and a tensioning belt.

3. The roof rack of claim 1, wherein said connection element is of an elongate configuration.

4. The roof rack of claim 1, wherein said coupling exerts a force against the undercut area.

5. The roof rack of claim 1, wherein said coupling further includes a hook and an eye.

6. The roof rack of claim 1, wherein the vehicle further includes a hinge for attachment of a rear door, said bent-back end being attached to the hinge.

7. The roof rack of claim 1, wherein the vehicle further includes a hinge for attachment of a rear door, the hinge having two spaced-apart arms, said bent-back end being attached to one of the arms.

8. A roof rack for a vehicle having lateral roof rails and a rear roof rail having an undercut area, the rack comprising:
   a crossmember;
   fastening feet attached to said crossmember and secured to the lateral roof rails;
   a connection element generally perpendicular to said crossmember, said crossmember being connected directly to the rear roof rail by said element, said element having a force-exerting coupling that includes a bent-back end for placement against the undercut.

9. The roof rack of claim 8, wherein said bent-back end defines a hook.

10. The roof rack of claim 8, wherein said connection element is selected from the group consisting of tension rod, a bending member and a tensioning belt.

11. The roof rack of claim 8, wherein said connection element is of an elongate configuration.

12. The roof rack of claim 8, wherein said coupling further includes a hook and an eye.

13. The roof rack of claim 8, wherein the vehicle further includes a hinge for attachment of a rear door, said bent-back end being attached to the hinge.

14. The roof rack of claim 8, wherein the vehicle further includes a hinge for attachment of a rear door, the hinge having two spaced-apart arms, said bent-back end being attached to one of the arms.

\* \* \* \* \*